(12) United States Patent
Fujimoto (10) Patent No.: US 10,564,674 B2
(45) Date of Patent: Feb. 18, 2020

(54) INFORMATION PROCESSING DEVICE

(71) Applicant: Sharp Kabushiki Kaisha, Sakai, Osaka (JP)

(72) Inventor: Hidetoshi Fujimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/328,759

(22) PCT Filed: Sep. 1, 2016

(86) PCT No.: PCT/JP2016/075708
§ 371 (c)(1),
(2) Date: Feb. 27, 2019

(87) PCT Pub. No.: WO2018/042602
PCT Pub. Date: Mar. 8, 2018

(65) Prior Publication Data
US 2019/0220061 A1    Jul. 18, 2019

(51) Int. Cl.
*G06F 1/16* (2006.01)
(52) U.S. Cl.
CPC .............. *G06F 1/1641* (2013.01); *G06F 1/16* (2013.01); *G06F 1/1618* (2013.01); *G06F 1/1626* (2013.01); *G06F 1/1649* (2013.01); *G06F 1/1652* (2013.01); *G06F 1/1681* (2013.01); *G06F 1/1662* (2013.01)
(58) Field of Classification Search
CPC ..... G06F 1/1616; G06F 1/1652; G06F 1/1681
See application file for complete search history.

(56) References Cited

U.S. PATENT DOCUMENTS

| | | | | |
|---|---|---|---|---|
| 5,739,810 A | * | 4/1998 | Merkel | G06F 1/1616 345/156 |
| 5,926,364 A | * | 7/1999 | Karidis | G06F 1/1616 312/223.2 |
| 6,154,359 A | * | 11/2000 | Kamikakai | G06F 1/1618 16/342 |

(Continued)

FOREIGN PATENT DOCUMENTS

| | | |
|---|---|---|
| JP | 06-019576 A | 1/1994 |
| JP | 2002-318641 A | 10/2002 |

(Continued)

OTHER PUBLICATIONS

Official Communication issued in International Patent Application No. PCT/JP2016/075708, dated Oct. 25, 2016.

*Primary Examiner* — Adrian S Wilson
(74) *Attorney, Agent, or Firm* — Keating & Bennett, LLP (57) ABSTRACT

An information processing device (11) includes, as a second connection section for connecting a first member (3) and a second member (4) with each other, a flexible hinge (19) that allows for rotation at least from (i) the angle at which a portion of a flexible display (7U) which portion is on the front surface of the second member (4) is in contact with a portion of the flexible display (7L) which portion is on the front surface of the first member (3) to (ii) the angle at which the portion of the flexible display (7U) which portion is on the front surface of the second member (4) is flush with the portion of the flexible display (7L) which portion is on the front surface of the first member (3).

15 Claims, 9 Drawing Sheets

(56) References Cited

U.S. PATENT DOCUMENTS

| | | | | |
|---|---|---|---|---|
| 6,421,235 B2 * | 7/2002 | Ditzik | | G06F 1/1616 |
| | | | | 320/114 |
| 6,480,373 B1 * | 11/2002 | Landry | | G06F 1/1616 |
| | | | | 16/308 |
| 6,700,773 B1 * | 3/2004 | Adriaansen | | G06F 1/1618 |
| | | | | 345/156 |
| 6,865,075 B2 * | 3/2005 | Oakley | | G06F 1/1618 |
| | | | | 345/173 |
| 7,061,472 B1 * | 6/2006 | Schweizer | | G06F 1/162 |
| | | | | 345/156 |
| 7,489,503 B2 * | 2/2009 | Maatta | | G06F 1/1616 |
| | | | | 16/367 |
| 7,813,775 B2 * | 10/2010 | Hyun | | H04M 1/0247 |
| | | | | 455/566 |
| 7,864,524 B2 * | 1/2011 | Ladouceur | | G06F 1/1616 |
| | | | | 361/679.55 |
| 7,970,442 B2 * | 6/2011 | Chiang | | H04M 1/0254 |
| | | | | 455/575.1 |
| 8,203,832 B2 * | 6/2012 | Szabolcsi | | G06F 1/1616 |
| | | | | 248/917 |
| 8,331,098 B2 * | 12/2012 | Leung | | G06F 1/1618 |
| | | | | 361/715 |
| 8,471,822 B2 * | 6/2013 | Lightenberg | | G06F 1/1616 |
| | | | | 345/173 |
| 8,787,016 B2 * | 7/2014 | Rothkopf | | H04M 1/0216 |
| | | | | 361/679.55 |
| 8,988,876 B2 * | 3/2015 | Corbin | | A45C 13/002 |
| | | | | 361/679.58 |
| 9,107,287 B2 * | 8/2015 | Ryu | | G06F 1/1616 |
| D750,036 S * | 2/2016 | Endo | | D14/126 |
| 9,292,114 B2 * | 3/2016 | Adamson | | G06F 3/041 |
| 9,547,340 B2 * | 1/2017 | Min | | G06F 1/1652 |
| D815,088 S * | 4/2018 | Fujimoto | | D14/316 |
| 10,095,346 B2 * | 10/2018 | Gao | | G06F 3/1423 |
| 2002/0141146 A1 * | 10/2002 | Mustoe | | G06F 1/1616 |
| | | | | 361/679.04 |
| 2004/0160736 A1 * | 8/2004 | Lin | | G06F 1/1616 |
| | | | | 361/679.04 |
| 2004/0176047 A1 * | 9/2004 | Trively | | H04M 1/0214 |
| | | | | 455/90.3 |
| 2006/0012563 A1 * | 1/2006 | Fyke | | G06F 1/1616 |
| | | | | 345/156 |
| 2006/0050169 A1 | 3/2006 | Misawa | | |
| 2007/0004475 A1 * | 1/2007 | Kuo | | H04M 1/0214 |
| | | | | 455/575.3 |
| 2007/0060216 A1 * | 3/2007 | Huang | | A63F 13/00 |
| | | | | 455/575.3 |
| 2007/0097014 A1 * | 5/2007 | Solomon | | G06F 1/1616 |
| | | | | 345/1.1 |
| 2008/0167095 A1 * | 7/2008 | Kim | | H04M 1/0216 |
| | | | | 455/575.3 |
| 2009/0296331 A1 | 12/2009 | Choy | | |
| 2010/0085274 A1 | 4/2010 | Kilpatrick, II | | G06F 1/1616 |
| | | | | 345/1.3 |
| 2011/0126141 A1 * | 5/2011 | King | | G06F 1/1616 |
| | | | | 715/769 |
| 2012/0014054 A1 * | 1/2012 | Ashcraft | | G06F 1/1626 |
| | | | | 361/679.26 |
| 2012/0256929 A1 * | 10/2012 | Koenig | | H04L 12/00 |
| | | | | 345/503 |
| 2012/0307423 A1 * | 12/2012 | Bohn | | G06F 1/1641 |
| | | | | 361/679.01 |
| 2012/0314359 A1 | 12/2012 | Hsieh | | |
| 2014/0011548 A1 * | 1/2014 | Varela | | H04B 1/3888 |
| | | | | 455/566 |
| 2014/0043741 A1 * | 2/2014 | Smith | | G06F 1/16 |
| | | | | 361/679.3 |
| 2014/0160654 A1 * | 6/2014 | Yoo | | G06F 1/1637 |
| | | | | 361/679.12 |
| 2014/0226275 A1 | 8/2014 | Ko et al. | | |
| 2015/0277506 A1 | 10/2015 | Cheah et al. | | |
| 2017/0322598 A1 * | 11/2017 | Fujimoto | | G06F 1/1643 |
| 2019/0212781 A1 * | 7/2019 | Fujimoto | | G06F 1/1652 |

FOREIGN PATENT DOCUMENTS

| | | |
|---|---|---|
| JP | 2006-072115 A | 3/2006 |
| JP | 2006-174506 A | 6/2006 |
| JP | 2010-533914 A | 10/2010 |
| JP | 2012-256315 A | 12/2012 |
| JP | 2014-044627 A | 3/2014 |
| JP | 2014-161009 A | 9/2014 |
| JP | 2015-233198 A | 12/2015 |

* cited by examiner

INFORMATION PROCESSING DEVICE

TECHNICAL FIELD

The disclosure relates to an information processing device including a flexible display (flexible display panel). The disclosure more particularly relates to an information processing device including a flexible display panel which information processing device can be in any of a plurality of forms such as a tablet computer type, a laptop personal computer type, and a double-sided calendar type.

BACKGROUND ART

A tablet computer is suitably usable for a task such as a simple search. A laptop personal computer is suitably usable for a task such as creating a document. Selecting an information processing device such as a tablet computer and a laptop personal computer as appropriate according to the type of task to be performed can improve the efficiency of performing tasks.

Selecting an information processing device as such, however, involves the issue that it is necessary to buy and carry both a tablet computer and a laptop personal computer.

In view of that, there has been developed an information processing device that doubles as a tablet computer and a laptop personal computer, that is, an information processing device that can be in any of a plurality of forms such as a tablet computer type and a laptop personal computer type.

Patent Literature 1 discloses an information processing device that can be in either of two forms, namely a tablet computer type and a laptop personal computer type.

Figure 9:
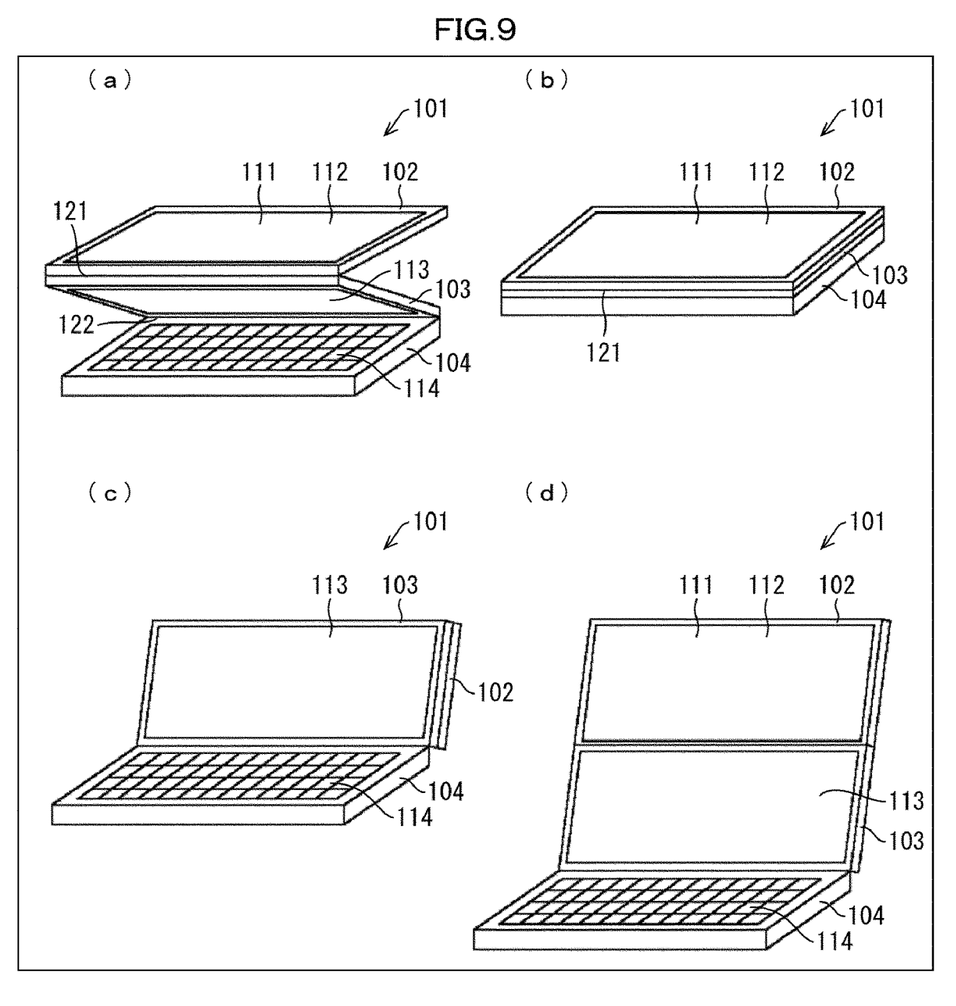
FIG. 9 provides diagrams each schematically illustrating the configuration of a conventional information processing device disclosed in Patent Literature 1.

FIG. 9 provides diagrams each schematically illustrating the configuration of a conventional information processing device 101 disclosed in Patent Literature 1.

As illustrated in (a) of FIG. 9, the information processing device 101 includes (i) a display section 102 including a touch panel 111 and a display device 112, (ii) a connection section 103 including a display device 113, and (iii) a body section 104 including a keyboard 114 on an upper surface thereof.

The connection section 103 has a rear edge attached rotatably to a junction section 122 located at the rear edge of the body section 104. The display section 102 has a front edge attached rotatably to a junction section 121 located at the front edge of the connection section 103. This allows the information processing device 101 to be transformed into, for example, a tablet computer type as illustrated in (b) of FIG. 9 or a laptop personal computer type as illustrated in (c) and (d) of FIG. 9.

CITATION LIST

Patent Literature

[Patent Literature 1]
Japanese Patent Application Publication, Tokukai, No. 2002-318641 (Publication Date: Oct. 31, 2002)
[Patent Literature 2]
Japanese Patent Application Publication, Tokukai, No. 2006-72115 (Publication Date: Mar. 16, 2006)
[Patent Literature 3]
Japanese Patent Application Publication, Tokukai, No. 2015-233198 (Publication Date: Dec. 24, 2015)

SUMMARY

Technical Problem

The information processing device 101, disclosed in Patent Literature 1, is configured as follows: The body section 104, which includes a keyboard 114 on an upper surface thereof, and the connection section 103, which includes a display device 113, are attached to each other in such a manner as to be rotatable by 180 degrees. The connection section 103 and the display section 102, which includes a display device 112, are also attached to each other in such a manner as to be rotatable by 180 degrees. Thus, to transform the information processing device 101 into a tablet computer type as illustrated in (b) of FIG. 9, in which form the keyboard 114 is not exposed, the body section 104, the connection section 103, and the display section 102 need to be placed on top of one another in order.

Thus, the information processing device 101, when transformed into a tablet computer type, unfortunately does not allow the display device 113, included in the connection section 103, to be used.

Further, the information processing device 101 is arranged such that the display device 112, which is included in the display section 102, and the display device 113, which is included in the connection section 103, are two separate sections as illustrated in FIG. 9. Thus, in a case where the display devices 112 and 113 are both used to display a single image as illustrated in (d) of FIG. 9, that image does not unfortunately look good as a result of the display devices 112 and 113 being separated from each other.

The disclosure has been accomplished in view of the above issues. It is an object of the disclosure to provide an information processing device that includes a display which can be used in its entirety even in a case where the information processing device is in the form of a tablet computer and which can display a natural image even in a case where the entirety of the display is used to display an image.

Solution to Problem

In order to attain the above object, an information processing device of the disclosure is an information processing device, including: a body section having a plate shape; a first member having a plate shape and connected with the body section; and a second member having a plate shape and connected with the first member, the body section having a back surface provided with an input surface for performing an input operation, the first member and the second member having respective front surfaces provided with a single flexible display present across both the front surfaces which flexible display is capable of being touched for an input operation, the body section and the first member being connected with each other via a first connection section, the first connection section being a flexible hinge that allows for rotation at least from (i) an angle at which a front surface of the body section which front surface is on an opposite side of the back surface of the body section is in contact with a first portion of the flexible display which first portion is on the front surface of the first member to (ii) an angle at which the input surface on the back surface of the body section is in contact with a back surface of the first member, the first member and the second member being connected with each other via a second connection section, the second connection section being a hinge that allows for rotation at least within a range from (i) an angle at which a second portion of the flexible display which second portion is on the front surface of the second member is in contact with the first portion of the flexible display to (ii) an angle at which the second portion of the flexible display is flush with the first portion of the flexible display.

With the above configuration, (i) the first member and the second member have respective front surfaces provided with a single flexible display present across both the front surfaces which flexible display is capable of being touched for an input operation, and (ii) an image is displayed by the single flexible display. The above configuration thus does not involve the issue of an image failing to look natural as a result of, for example, a plurality of displays being separated from each other by a gap as in a case where such a plurality of displays are used to display an image.

With the above configuration, the body section and the first member are connected with each other via a first connection section, the first connection section being a flexible hinge that allows for rotation at least from (i) an angle at which a front surface of the body section is in contact with a first portion of the flexible display which first portion is on the front surface of the first member to (ii) an angle at which the input surface on the back surface of the body section is in contact with a back surface of the first member. Further, with the above configuration, the first member and the second member are connected with each other via a second connection section, the second connection section being a hinge that allows for rotation at least within a range from (i) an angle at which a second portion of the flexible display which second portion is on the front surface of the second member is in contact with the first portion of the flexible display to (ii) an angle at which the second portion of the flexible display is flush with the first portion of the flexible display. The information processing device, even in the form of a tablet computer, makes it possible to use the entire display surface of a single flexible display that the user can touch for an input operation.

Advantageous Effects of Disclosure

An embodiment of the disclosure provides an information processing device that includes a display whose display surface can be used in its entirety even in a case where the information processing device is in the form of a tablet computer and which can display a natural image even in a case where the entire display surface of the display is used to display an image.

BRIEF DESCRIPTION OF DRAWINGS

(a) of FIG. 2 is a diagram illustrating the information processing device of FIG. 1 as it has been folded. (b) of FIG. 2 is a diagram illustrating the information processing device of FIG. 1 as it has been transformed into a laptop personal computer type.

(a) of FIG. 4 is a diagram illustrating a first member having a front surface with depressions. (b) of FIG. 4 is a diagram illustrating a second member having a front surface with depressions.

(a) of FIG. 6 is a diagram illustrating the information processing device of FIG. 5 as being in the form of a tablet computer having a relatively large display surface. (b) of FIG. 6 is a diagram illustrating the information processing device of FIG. 5 as being in a folded state and in the form of a tablet computer having a relatively small display surface.

(a) of FIG. 7 is a diagram illustrating a protrusion provided on the back surface of the second member. (b) of FIG. 7 is a diagram illustrating a depression provided in a side surface of the plate-shaped body section.

DESCRIPTION OF EMBODIMENTS

The following description will discuss embodiments of the disclosure with reference to FIGS. 1 to 8. In the description below, a member for an embodiment which member is identical in function to a member described for another embodiment may be assigned the same reference sign and may not be described again for convenience.

Embodiment 1

The following description will discuss Embodiment 1 of the disclosure with reference to FIGS. 1 to 4.

Figure 1:
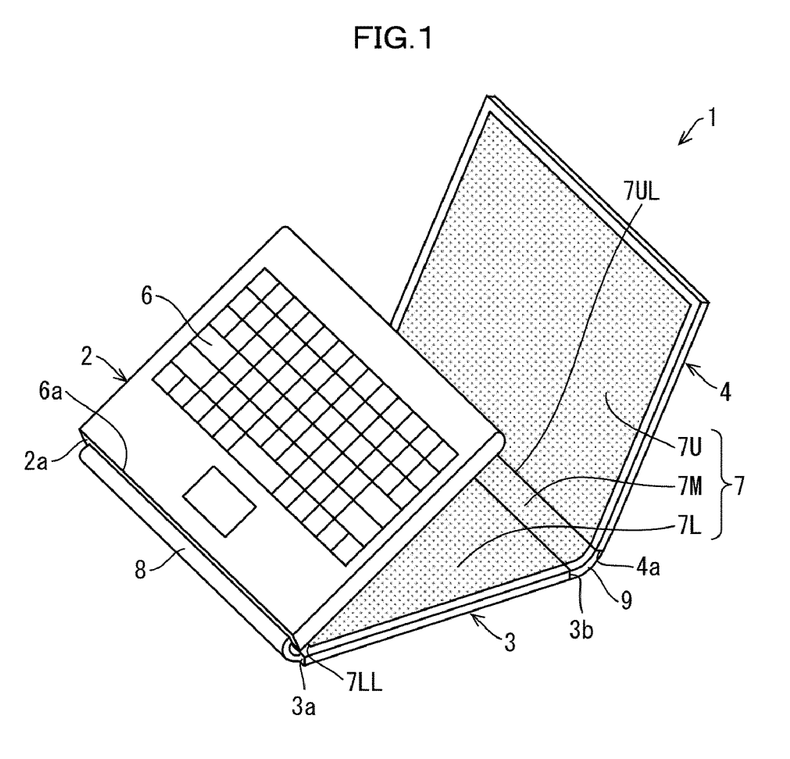
FIG. 1 is a diagram schematically illustrating the configuration of an information processing device including a first member, a second member, and a non-flexible movable hinge, the first member and the second member being connected with each other via the non-flexible movable hinge.

FIG. 1 is a diagram schematically illustrating the configuration of an information processing device 1 including a first member 3, a second member 4, and a non-flexible movable hinge 9, the first member 3 and the second member 4 being connected with each other via the non-flexible movable hinge 9.

As illustrated in FIG. 1, the information processing device 1 includes a plate-shaped body section 2, a plate-shaped first member 3 connected with the body section 2, and a plate-shaped second member 4 connected with the first member 3.

The plate-shaped body section 2 has a back surface as an input surface 6 for the user to carry out an input operation which back surface is provided with, for example, a keyboard or a pad section. The plate-shaped body section 2 may have a front surface on the opposite side of the back surface which front surface is, for example, a flat surface or a non-flat surface (for example, an uneven surface or a curved surface). Such a flat or non-flat surface may have a pattern or the like.

The present embodiment is arranged such that the plate-shaped body section 2 contains components such as (i) a battery for supplying electric power for the entire information processing device 1, (ii) a cable/wireless communication device, (iii) an antenna for wireless communication, (iv) a substrate provided with, for example, a central processing unit (CPU) and memories, and (v) an internal loudspeaker. The present embodiment is, however, not limited to such an arrangement. The above components may be contained as appropriate in not only the plate-shaped body section 2 but also the first member 3 and the second member 4.

The plate-shaped body section 2 has a side surface(s) provided with terminal sections (not shown) such as a USB (registered trademark) terminal, an audio output terminal, and/or an electric power cord connection terminal.

The plate-shaped body section 2 and the first member 3 are connected with each other via a flexible hinge 8 as a first connection section. Specifically, the plate-shaped body section 2 and the first member 3 are connected with each other such that in a case where the plate-shaped body section 2 and the first member 3 are placed on a surface in open form, that is, in such a manner as not to be placed on top of each other, the respective front surfaces of the plate-shaped body section 2 and the first member 3 face in the same direction (or the input surface 6 as the back surface of the plate-shaped body section 2 and the back surface of the first member 3 face in the same direction). The front surface of the first member 3 is on the opposite side of the back surface of the first member 3.

That portion of the plate-shaped body section 2 which is connected with the flexible hinge 8 is a side surface 2a of the body section 2 which side surface 2a corresponds to the lowermost portion 6a of the input surface 6. That portion of the first member 3 which is connected with the flexible hinge 8 is a side surface 3a of the first member 3 which side surface 3a is near a lowermost portion 7LL of a lower display region 7L of a flexible display 7 which lower display region 7L is on the front surface of the first member 3.

The flexible hinge 8 is made of, for example, a flexible material such as rubber and silicon. The flexibility of the material of the hinge allows for rotational movement.

The flexible hinge 8, which is used for the information processing device 1 to connect the plate-shaped body section 2 and the first member 3 with each other, allows for rotation from (i) the angle at which the front surface of the plate-shaped body section 2 is in contact with the lower display region 7L of the flexible display 7, which lower display region 7L is on the front surface of the first member 3, to (ii) the angle at which the input surface 6, which is the back surface of the plate-shaped body section 2, is in contact with the back surface of the first member 3.

Due to its flexibility, the flexible hinge 8 does not allow the plate-shaped body section 2 to be fixed at a predetermined angle to the first member 3 or the first member 3 to be fixed at a predetermined angle to the plate-shaped body section 2. However, the information processing device 1 is designed such that the plate-shaped body section 2 can be fixed either on the lower display region 7L of the flexible display 7, which lower display region 7L is on the front surface of the first member 3, or on the back surface of the first member 3. This allows the flexible hinge 8 to be used suitably.

The flexible hinge 8 may include a conductor (not shown) for flexible wiring for supplying various signals and/or the like via the flexible hinge 8.

The first member 3, which is connected with the plate-shaped body section 2 via the flexible hinge 8, is connected with the second member 4 via the non-flexible movable hinge 9 as a second connection section. Specifically, the first member 3 and the second member 4 are connected with each other such that in a case where the first member 3 and the second member 4 are placed on a surface in open form, that is, in such a manner as not to be placed on top of each other, the respective front surfaces of the first member 3 and the second member 4 face in the same direction (or the respective back surfaces of the first member 3 and the second member 4 face in the same direction). The front surface of the second member 4 is on the opposite side of the back surface of the second member 4.

That portion of the first member 3 which is connected with the non-flexible movable hinge 9 is a side surface 3b, which is on the opposite side of the side surface 3a (to which the flexible hinge 8 is connected). That portion of the second member 4 which is connected with the non-flexible movable hinge 9 is a side surface 4a of the second member 4 which side surface 4a is near a lowermost portion 7UL of an upper display region 7U of the flexible display 7, which upper display region 7U is on the front surface of the second member 4.

The non-flexible movable hinge 9 may include flexible wiring (not shown) for supplying various signals and/or the like via the non-flexible movable hinge 9.

The non-flexible movable hinge 9 is made of, for example, a non-flexible material such as resin and metal. This mechanistically allows the non-flexible movable hinge 9 to rotate without moving in the up-down or left-right direction.

The present embodiment is arranged as follows: The non-flexible movable hinge 9 is, for example, a rotatable two-axis hinge commonly used for connection between a body section and a display section of a commercially available laptop personal computer. The non-flexible movable hinge 9 is capable of (i) rotating by an angle (open-close operation angle) of 0 degrees to 180 degrees and (ii) being fixed at a desired angle within a range of 0 degrees to 180 degrees.

Using such a non-flexible movable hinge 9 for the information processing device 1 allows the first member 3 to be fixed at a predetermined angle to the second member 4 and the second member 4 to be fixed at a predetermined angle to the first member 3.

In order for the information processing device 1 to be capable of being transformed into a tablet computer type, the non-flexible movable hinge 9 at least allows for rotation from (i) the angle at which the upper display region 7U of the flexible display 7, which upper display region 7U is on the front surface of the second member 4, is in contact with the lower display region 7L of the flexible display 7, which lower display region 7L is on the front surface of the first member 3, to (ii) the angle at which the upper display region 7U of the flexible display 7, which upper display region 7U is on the front surface of the second member 4, is flush with the lower display region 7L of the flexible display 7, which lower display region 7L is on the front surface of the first member 3.

The respective back surfaces of the first member 3 and the second member 4, which are on the opposite side of the respective front surfaces of the first member 3 and the second member 4 (on which front surfaces the flexible display 7 is provided), may each be, for example, a flat surface or a non-flat surface (for example, an uneven surface or a curved surface) similarly to the front surface of the plate-shaped body section 2. Such a flat or non-flat surface may have a pattern or the like.

The respective front surfaces of the first member 3 and the second member 4 are provided with a single flexible display 7 that the user can touch for an input operation, that is, a flexible display 7 having a touch panel function, which flexible display 7 is present across both the front surfaces. The flexible display 7 includes (i) a lower display region 7L on the front surface of the first member 3, (ii) an upper display region 7U on the front surface of the second member 4, and (iii) a middle display region 7M on the non-flexible movable hinge 9.

The flexible display 7 can be attached to the respective front surfaces of the first member 3 and the second member 4 as appropriate with use of an adhesive or the like. The attachment method is, however, not limited to that.

Figure 2:
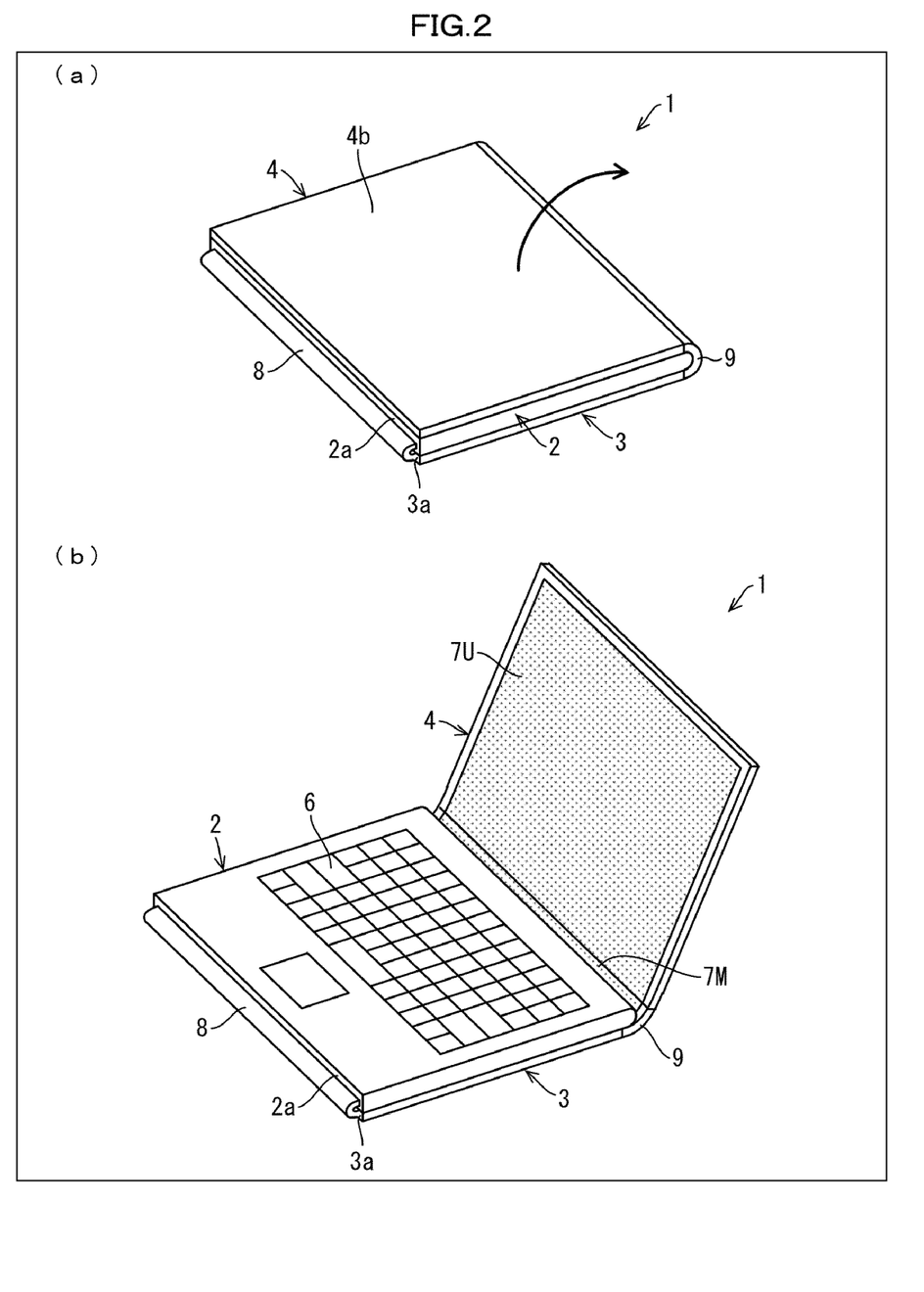

(a) of FIG. 2 is a diagram illustrating the information processing device 1 of FIG. 1 as it has been folded. (b) of FIG. 2 is a diagram illustrating the information processing device 1 of FIG. 1 as it has been transformed into a laptop personal computer type.

As illustrated in (a) of FIG. 2, when the information processing device 1 has been folded, (i) the front surface of the plate-shaped body section 2 is in contact with the lower display region 7L of the flexible display 7, which lower display region 7L is on the front surface of the first member 3, and (ii) the upper display region 7U of the flexible display 7, which upper display region 7U is on the front surface of the second member 4, is in contact with the input surface 6 as the back surface of the plate-shaped body section 2.

When the information processing device 1 is in this state, the back surface of the first member 3 and the back surface 4b of the second member 4 are exposed to the outside, and the flexible display 7 and the plate-shaped body section 2 are not exposed to the outside. This allows the flexible display 7 and the plate-shaped body section 2 to be protected.

In a case where the second member 4 of the information processing device 1 illustrated in (a) of FIG. 2 has been opened as shown with an arrow in (a) of FIG. 2, the information processing device 1 is in the form of a laptop personal computer as illustrated in (b) of FIG. 2.

As illustrated, when the information processing device 1 is in the form of a laptop personal computer, the front surface of the plate-shaped body section 2 is in contact with the lower display region 7L of the flexible display 7, which lower display region 7L is on the front surface of the first member 3, and the second member 4 is fixed at a predetermined angle to the first member 3.

Figure 3:
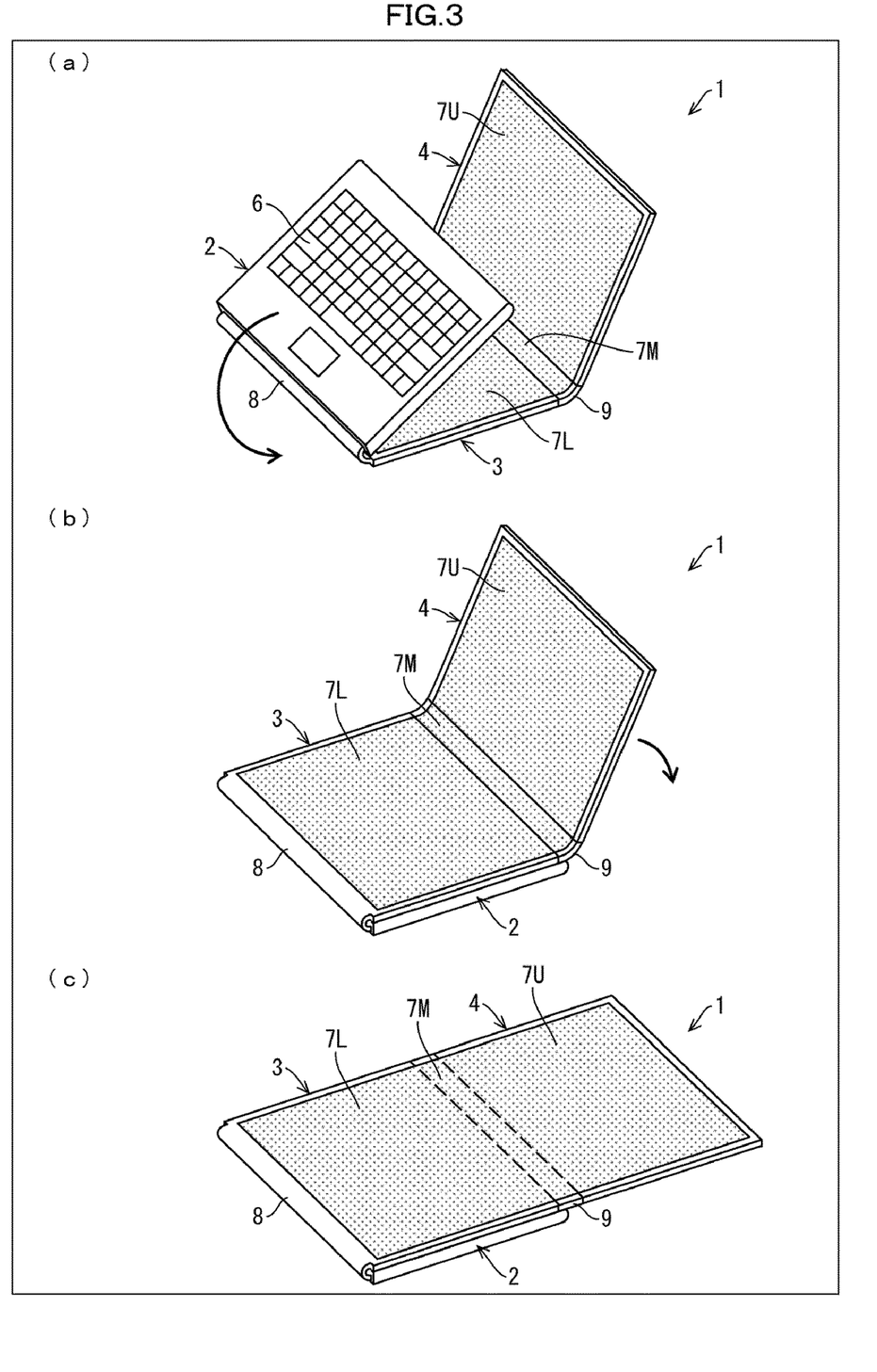
FIG. 3 provides diagrams each illustrating how the information processing device illustrated in FIG. 1 has been transformed from the laptop personal computer type illustrated in (b) of FIG. 2 into a tablet computer type.

FIG. 3 provides diagrams each illustrating how the information processing device 1 illustrated in FIG. 1 has been transformed from the laptop personal computer type illustrated in (b) of FIG. 2 into a tablet computer type.

The information processing device 1 in the form of a laptop personal computer illustrated in (b) of FIG. 2 is transformed as follows: The plate-shaped body section 2 is rotated in the direction shown with an arrow in (a) of FIG. 3. The input surface 6 as the back surface of the plate-shaped body section 2 is brought into contact with the back surface of the first member 3 as illustrated in (b) of FIG. 3. The second member 4 is rotated in the direction shown with an arrow in (b) of FIG. 3 so that the upper display region 7U of the flexible display 7, which upper display region 7U is on the front surface of the second member 4, is flush with the lower display region 7L of the flexible display 7, which lower display region 7L is on the front surface of the first member 3, as illustrated in (c) of FIG. 3.

The information processing device 1 in the form of a tablet computer illustrated in (c) of FIG. 3 causes a single flexible display 7 to display an image, and does not involve the issue of an image failing to look natural as a result of, for example, a plurality of displays being separated from each other by a gap as in a case where such a plurality of displays are used to display an image. The information processing device 1 in the form of a tablet computer illustrated in (c) of FIG. 3 makes it possible to use the entire display surface of a single flexible display 7 that the user can touch for an input operation.

The first member 3 and the second member 4 may each be, for example, a housing or a substrate. The respective front surfaces of the first member 3 and the second member 4, which front surfaces are in contact with the flexible display 7, may have, for example, a depression for accommodating a component (for example, a driving circuit) provided for the flexible display 7.

Figure 4:
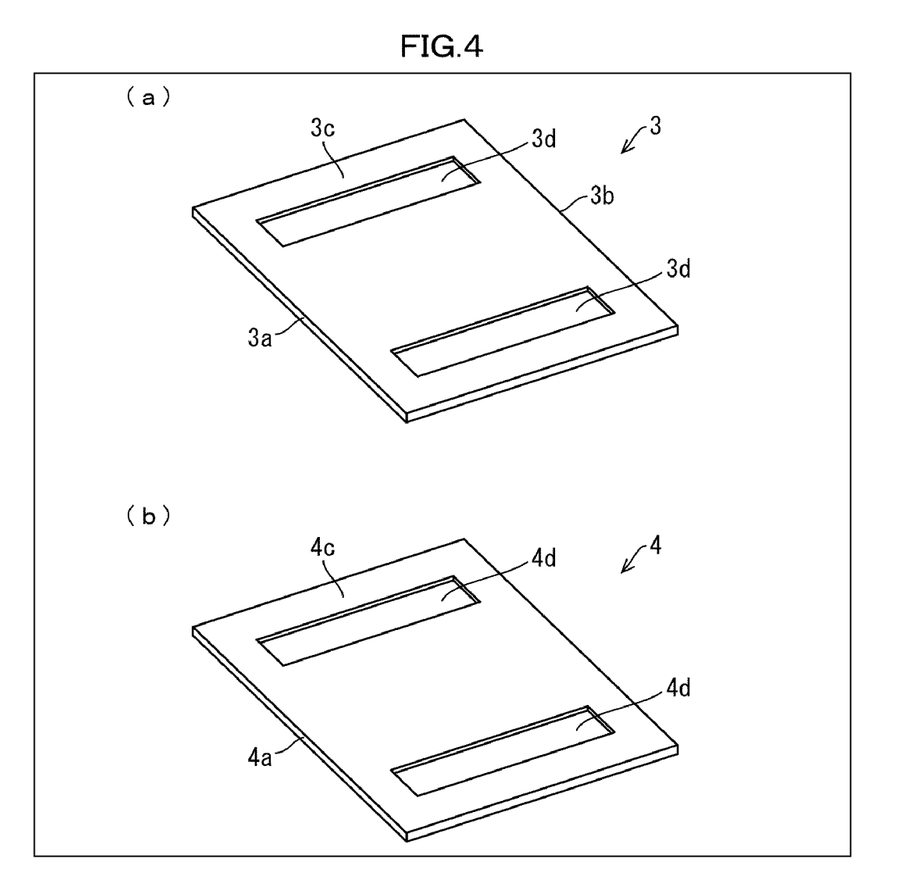

(a) of FIG. 4 is a diagram illustrating a first member 3 having a front surface 3c with depressions 3d. (b) of FIG. 4 is a diagram illustrating a second member 4 having a front surface 4c with depressions 4d.

The depressions 3d and 4d are each capable of suitably accommodating a component provided for the flexible display 7. The respective sizes and shapes of the depressions 3d and 4d can each be changed as appropriate according to the size and shape of the component to be accommodated.

The plate-shaped body section 2, the first member 3, and the second member 4 may each be made of, for example, a resin material or a metal material. The material is not limited to any particular one. However, the plate-shaped body section 2, the first member 3, and the second member 4 are preferably made of the same material in terms of design ability.

The flexible display 7 is a flexible display panel. Examples of the flexible display 7 include a flexible organic EL panel and a reflective liquid crystal display panel (neither of which requires a backlight unit).

The driving circuit for the flexible display 7 may be an external driving circuit or may be provided on a flexible substrate.

Embodiment 2

The following description will discuss Embodiment 2 of the disclosure with reference to FIGS. 5 to 8. The present embodiment is similar to Embodiment 1 except that the first member 3 and the second member 4 are connected with each other via a flexible hinge 19 similar to the flexible hinge 8, which connects the plate-shaped body section 2 and the first member 3 with each other. A member of the present embodiment which member is identical in function to a member illustrated in the drawings for Embodiment 1 is assigned the same reference sign and is not described again here for convenience.

Figure 5:
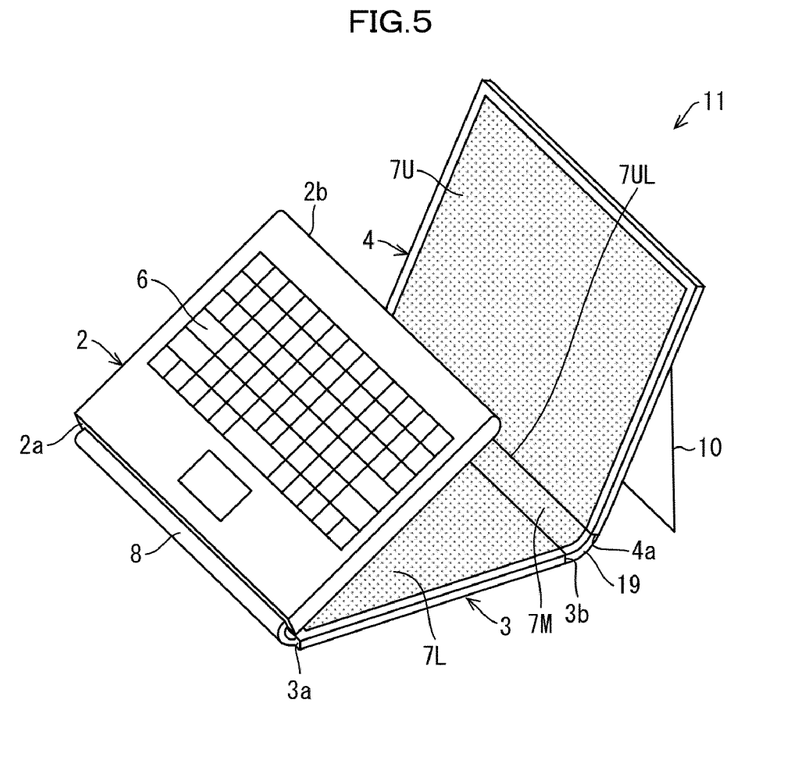
FIG. 5 is a diagram schematically illustrating the configuration of an information processing device including a first member, a second member, and a flexible hinge, the first member and the second member being connected with each other via the flexible hinge.

FIG. 5 is a diagram schematically illustrating the configuration of an information processing device 11 including a first member 3, a second member 4, and a flexible hinge 19, the first member 3 and the second member 4 being connected with each other via the flexible hinge 19.

As illustrated, the first member 3 is connected with the second member 4 via the flexible hinge 19 as the second connection section. Specifically, the first member 3 and the second member 4 are connected with each other such that in a case where the first member 3 and the second member 4 are placed on a surface in open form, that is, in such a manner as not to be placed on top of each other, the respective front surfaces of the first member 3 and the second member 4 face in the same direction (or the respective back surfaces of the first member 3 and the second member 4 face in the same direction).

That portion of the first member 3 which is connected with the flexible hinge 19 is a side surface 3b, which is on the opposite side of the side surface 3a (to which the flexible hinge 8 is connected). That portion of the second member 4 which is connected with the flexible hinge 19 is a side surface 4a of the second member 4 which side surface 4a is near a lowermost portion 7UL of an upper display region 7U of the flexible display 7, which upper display region 7U is on the front surface of the second member 4.

Similarly to the flexible hinge 8, the flexible hinge 19 is made of, for example, a flexible material such as rubber and silicon. The flexibility of the material of the hinge allows for rotational movement.

The flexible hinge 19, which is used for the information processing device 11 to connect the first member 3 and the second member 4, allows for rotation at least from (i) the angle at which the upper display region 7U of the flexible display 7, which upper display region 7U is on the front surface of the second member 4, is in contact with the lower display region 7L of the flexible display 7, which lower display region 7L is on the front surface of the first member 3, to (ii) the angle at which the back surface of the second member 4 is in contact with the back surface of the first member 3.

The flexible hinges 8 and 19 may each include a conductor (not shown) for flexible wiring for supplying various signals and/or the like via the flexible hinge 8 or 19.

Due to its flexibility, the flexible hinge 19 does not allow the first member 3 to be fixed at a predetermined angle to the second member 4 or the second member 4 to be fixed at a predetermined angle to the first member 3. Thus, the back surface of the second member 4 is provided with a stand as an angle fixing section 10 that allows the second member 4 to be fixed at a predetermined angle to the first member 3.

Using an angle fixing section 10 for the information processing device 11 allows the first member 3 to be fixed at a predetermined angle to the second member 4 and the second member 4 to be fixed at a predetermined angle to the first member 3.

The stand as the angle fixing section 10 is preferably capable of (i) being attached to and detached from any portion of the back surface of the second member 4 and (ii) being adjusted to change its height.

The information processing device 11 in the state illustrated in FIG. 5 can be transformed into a laptop personal computer type by (i) rotating the plate-shaped body section 2 so that the front surface of the plate-shaped body section 2 is in contact with the lower display region 7L of the flexible display 7, which lower display region 7L is on the front surface of the first member 3, and (ii) fixing the second member 4 at a predetermined angle to the first member 3 with use of the angle fixing section 10.

Figure 6:
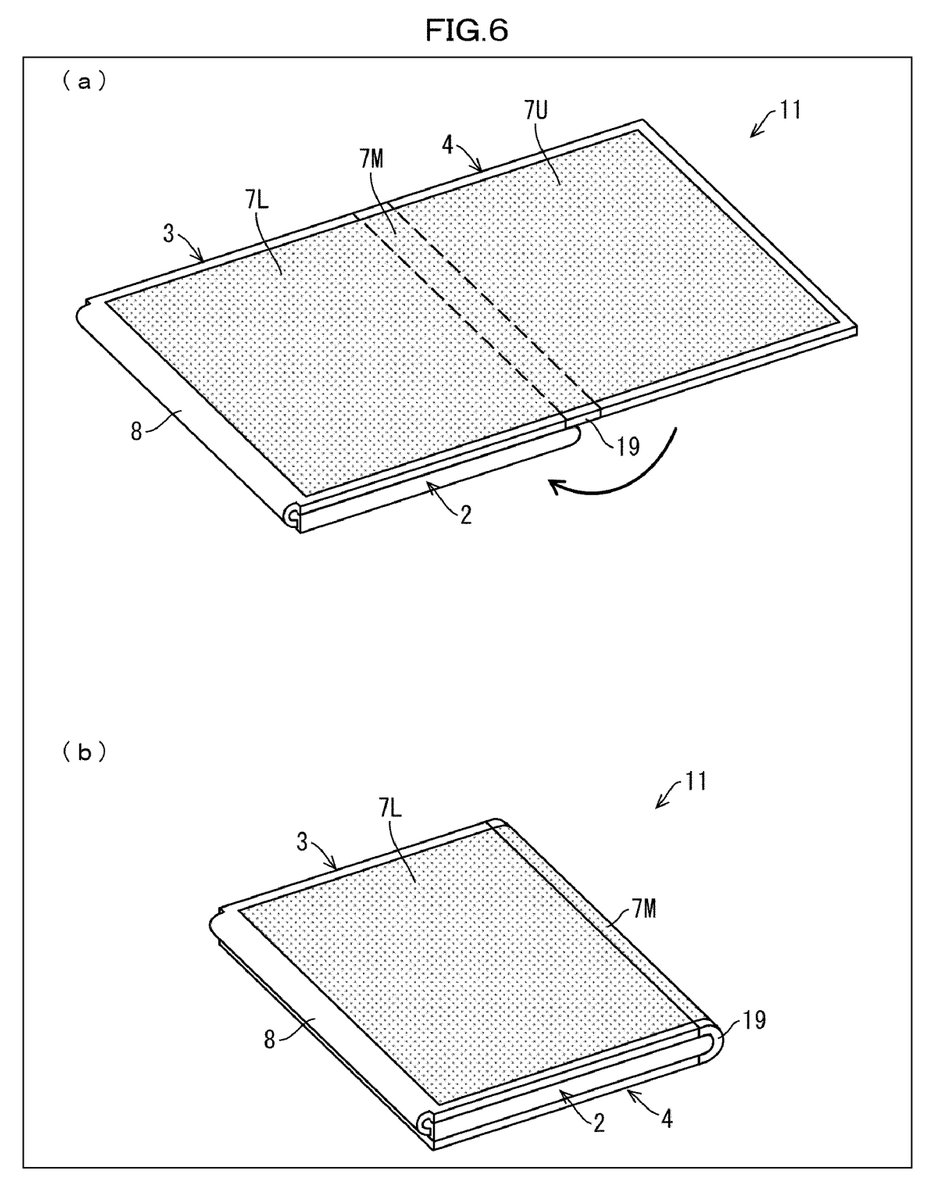

(a) of FIG. 6 is a diagram illustrating the information processing device 11 of FIG. 5 as being in the form of a tablet computer having a relatively large display surface. (b) of FIG. 6 is a diagram illustrating the information processing device 11 of FIG. 5 as being in a folded state and in the form of a tablet computer having a relatively small display surface.

The information processing device 11 can be transformed into a tablet computer type having a relatively large display surface illustrated in (a) of FIG. 6 by (i) rotating the plate-shaped body section 2 so that the input surface 6 as the back surface of the plate-shaped body section 2 is in contact with the back surface of the first member 3 and (ii) adjusting the attachment position and height of the stand as the angle fixing section 10 so that the upper display region 7U of the flexible display 7, which upper display region 7U is on the front surface of the second member 4, is flush with the lower display region 7L of the flexible display 7, which lower display region 7L is on the front surface of the first member 3.

The information processing device 11 can be transformed into a tablet computer type having a relatively small display surface illustrated in (b) of FIG. 6 by (i) rotating the plate-shaped body section 2 so that the input surface 6 as the back surface of the plate-shaped body section 2 is in contact with the back surface of the first member 3, (ii) detaching the stand as the angle fixing section 10 from the back surface of the second member 4, and (iii) rotating the second member 4 so that the back surface of the second member 4 is in contact with the front surface of the plate-shaped body section 2.

Figure 7:
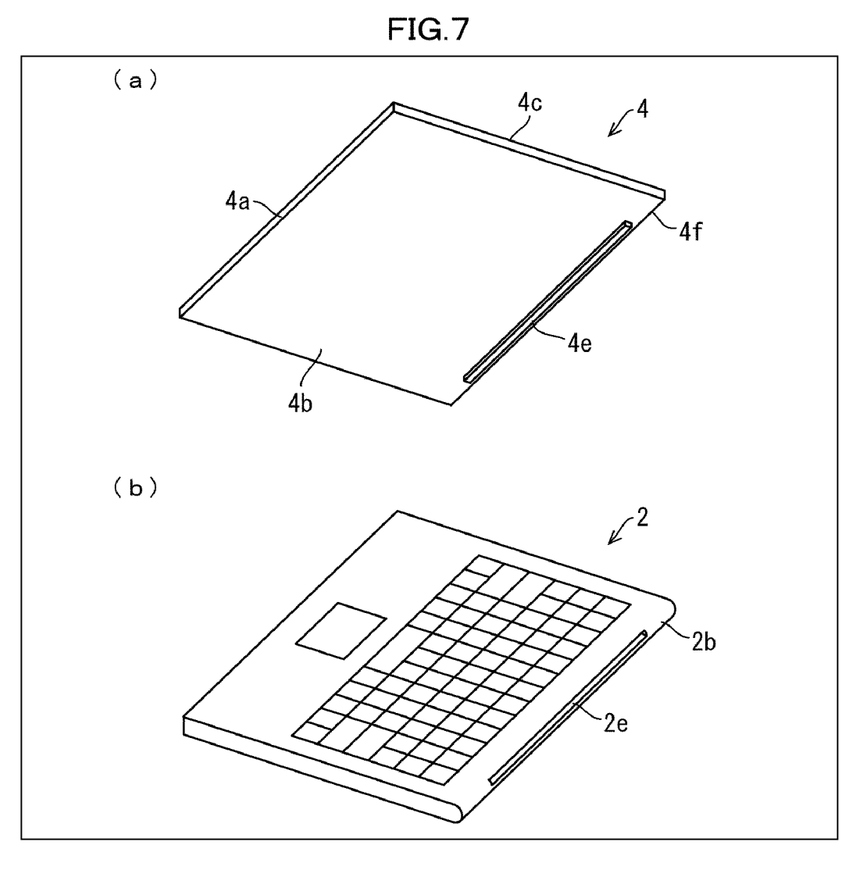

(a) of FIG. 7 is a diagram illustrating a protrusion 4e provided on the back surface 4b of the second member 4. (b) of FIG. 7 is a diagram illustrating a depression 2e provided in a side surface 2b of the plate-shaped body section 2 which side surface 2b is on the opposite side of the side surface 2a.

As illustrated in (a) of FIG. 7, the second member 4 has a protrusion 4e as part of a connection mechanism on a portion of the back surface 4b of the second member 4 which portion is near a side surface 4f of the second member 4 which side surface 4f is on the opposite side of the side surface 4a, to which the flexible hinge 19 is connected. The portion near the side surface 4f also covers the side surface 4f itself.

As illustrated in (b) of FIG. 7, the side surface 2b of the plate-shaped body section 2, which side surface 2b is on the opposite side of the side surface 2a, has a depression 2e as part of the connection mechanism.

Figure 8:
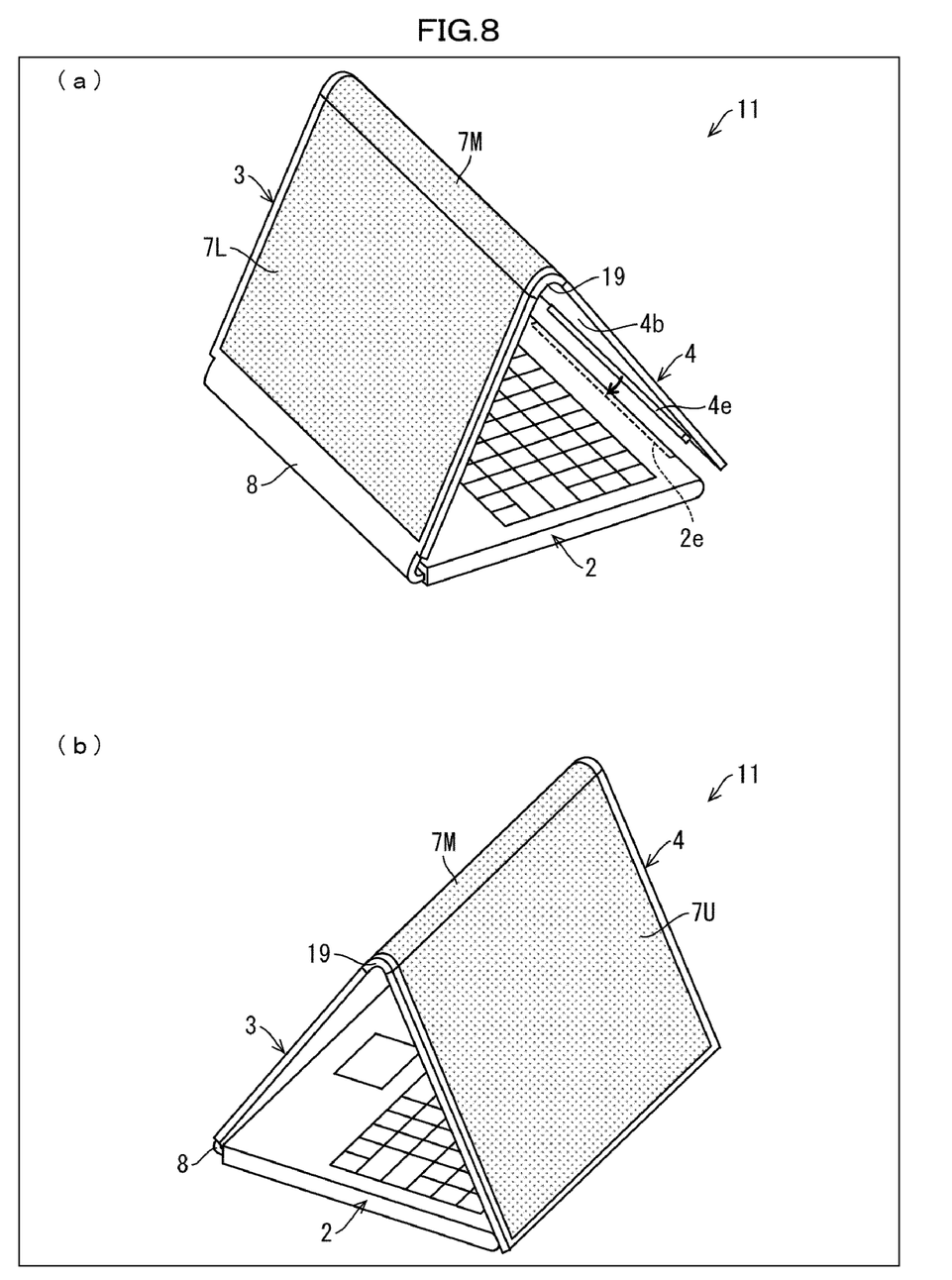
FIG. 8 provides diagrams each illustrating the information processing device of FIG. 5 as being in the form of a double-sided calendar.

FIG. 8 provides diagrams each illustrating the information processing device 11 of FIG. 5 as being in the form of a double-sided calendar.

The information processing device 11 can be transformed into a double-sided calendar type as illustrated in (a) and (b) of FIG. 8 by inserting the protrusion 4e into the depression 2e so that the side surface 2b of the plate-shaped body section 2 and the back surface 4b of the second member 4 are connected with each other and that the back surface of the first member 3, the back surface of the second member 4, and the input surface 6 as the back surface of the plate-shaped body section 2 are fixed so as to face inward. This allows different users to look at the lower display region 7L of the flexible display 7, which lower display region 7L is on the front surface of the first member 3, and the upper display region 7U of the flexible display 7, which upper display region 7U is on the front surface of the second member 4.

The information processing device 11 is arranged as described above such that the first member 3 and the second member 4 are connected with each other via the flexible hinge 19. This allows the second member 4 to be rotated by a larger angle to the first member 3. The above arrangement also allows the information processing device 11 to be transformed into, for example, any of the types described for Embodiment 1 as well as a tablet computer type having a relatively small display surface illustrated in (b) of FIG. 6 or a double-sided calendar type illustrated in FIG. 8.

The present embodiment is an example case in which the plate-shaped body section 2 has a depression 2e as part of a connection mechanism, and the second member 4 has, as part of the connection mechanism, a protrusion 4e insertable into the depression 2e. The present embodiment is, however, not limited to such an arrangement. The present embodiment may be arranged such that the depression 2e and the protrusion 4e illustrated in (a) and (b) of FIG. 7 are replaced with magnets at the respective positions so that the magnets serve to connect the side surface 2b of the plate-shaped body section 2 and the back surface 4b of the second member 4 with each other. The present embodiment may alternatively be arranged such that the plate-shaped body section 2 has a protrusion and that the second member 4 has a depression.

The position of the depression 2e in the plate-shaped body section 2 and the position of the protrusion 4e on the second member 4 are not limited to those illustrated in (a) and (b) of FIG. 7 as long as a portion of the plate-shaped body section 2 which portion is near the side surface 2b, which is on the opposite side of the side surface 2a (to which the flexible hinge 8 is connected), and a portion of the second member 4 which portion is near the side surface 4f, which is on the opposite side of the side surface 4a (to which the flexible hinge 19 is connected), are connectable with each other. The present embodiment may be arranged such that a portion of the plate-shaped body section 2 which portion is near the side surface 2b (second end), which is on the opposite side of the side surface 2a (first end) (to which the flexible hinge 8 is connected), and a portion of the second member 4 which portion is near the side surface 4f (fourth end), which is on the opposite side of the side surface 4a (third end) (to which the flexible hinge 19 is connected), are provided with a connection mechanism. The portion near the side surface 2b also covers the side surface 2b itself.

Similarly to Embodiment 1, the information processing device 11 may be arranged such that the first member 3 and the second member 4 are each, for example, a housing or a substrate. The respective front surfaces of the first member 3 and the second member 4, which front surfaces are in contact with the flexible display 7, may have, for example, a depression (see, for example, the depressions 3d illustrated in (a) of FIG. 4 and the depressions 4d illustrated in (b) of FIG. 4) for accommodating a component (for example, a driving circuit) provided for the flexible display 7.

[Recap]

An information processing device in accordance with a first aspect of the disclosure is an information processing device, including: a body section having a plate shape; a first member having a plate shape and connected with the body section; and a second member having a plate shape and connected with the first member, the body section having a back surface provided with an input surface for performing an input operation, the first member and the second member having respective front surfaces provided with a single flexible display present across both the front surfaces which flexible display is capable of being touched for an input operation, the body section and the first member being connected with each other via a first connection section, the first connection section being a flexible hinge that allows for rotation at least from (i) an angle at which a front surface of the body section which front surface is on an opposite side of the back surface of the body section is in contact with a first portion of the flexible display which first portion is on the front surface of the first member to (ii) an angle at which the input surface on the back surface of the body section is in contact with a back surface of the first member, the first member and the second member being connected with each other via a second connection section, the second connection section being a hinge that allows for rotation at least within a range from (i) an angle at which a second portion of the flexible display which second portion is on the front surface of the second member is in contact with the first portion of the flexible display to (ii) an angle at which the second portion of the flexible display is flush with the first portion of the flexible display.

With the above configuration, (i) the first member and the second member have respective front surfaces provided with a single flexible display present across both the front surfaces which flexible display is capable of being touched for an input operation, and (ii) an image is displayed by the single flexible display. The above configuration thus does not involve the issue of an image failing to look natural as a result of, for example, a plurality of displays being separated from each other by a gap as in a case where such a plurality of displays are used to display an image.

With the above configuration, the body section and the first member are connected with each other via a first connection section, the first connection section being a flexible hinge that allows for rotation at least from (i) an angle at which a front surface of the body section which front surface is on an opposite side of the back surface of the body section is in contact with a first portion of the flexible display which first portion is on the front surface of the first member to (ii) an angle at which the input surface on the back surface of the body section is in contact with a back surface of the first member. Further, with the above configuration, the first member and the second member are connected with each other via a second connection section, the second connection section being a hinge that allows for rotation at least within a range from (i) an angle at which a second portion of the flexible display which second portion is on the front surface of the second member is in contact with the first portion of the flexible display to (ii) an angle at which the second portion of the flexible display is flush with the first portion of the flexible display. The information processing device, even in the form of a tablet computer, makes it possible to use the entire display surface of a single flexible display that the user can touch for an input operation.

An information processing device in accordance with a second aspect of the disclosure is configured as in the first aspect and may preferably be further configured such that the hinge as the second connection section is a non-flexible movable hinge capable of being fixed at a predetermined angle within the range.

The above configuration involves use of a non-flexible movable hinge capable of being fixed at a predetermined angle within the range. This eliminates the need to provide a separate angle fixing section for the information processing device.

An information processing device in accordance with a third aspect of the disclosure is configured as in the first aspect and may preferably be further configured such that the second connection section is a flexible hinge that allows for rotation at least from (i) the angle at which the second portion of the flexible display is in contact with the first portion of the flexible display to (ii) an angle at which a back surface of the second member is in contact with the back surface of the first member.

With the above configuration, the first member and the second member are connected with each other via a flexible hinge. This allows the second member to be rotated by a larger angle to the first member, and thereby allows the information processing device to be transformed into any of a wider range of forms such as a double-sided calendar type.

An information processing device in accordance with a fourth aspect of the disclosure is configured as in the third aspect and may preferably be further configured such that the back surface of the second member is provided with an angle fixing section capable of fixing the second member relative to the first member at a predetermined angle within the range.

With the above configuration, the information processing device includes a separate angle fixing section. This allows the second member to be fixed at a predetermined angle to the first member even in a case where the first member and the second member are connected with each other via a flexible hinge.

An information processing device in accordance with a fifth aspect of the disclosure is configured as in the third aspect and may preferably be further configured such that the body section has a first end connected with the first connection section and a second end on an opposite side of the first end, the second member has a third end connected with the second connection section and a fourth end on an opposite side of the third end, and the information processing device further includes a connection mechanism for connecting (i) a portion of the body section which portion is at and near the second end with (ii) a portion of the second member which portion is at and near the fourth end.

With the above configuration, the information processing device includes a connection mechanism for connecting an end of the second member with an end of the body section. This allows the information processing device to be transformed into a double-sided calendar type.

An information processing device in accordance with a sixth aspect of the disclosure is configured as in any one of the first to fifth aspects and may preferably be further configured such that at least one of the first connection section and the second connection section includes flexible wiring.

The above configuration allows various signals and/or the like to be supplied via at least one of the first connection section and the second connection section.

An information processing device in accordance with a seventh aspect of the disclosure is configured as in any one of the first to sixth aspects and may preferably be further configured such that at least one of the respective front surfaces of the first member and the second member has a depression.

With the above configuration, the depression can accommodate a component (for example, a driving circuit) provided for the flexible display.

An information processing device in accordance with an eighth aspect of the disclosure is configured as in the second or fourth aspect and may be further configured such that the front surface of the body section is in contact with the first portion of the flexible display, and the second member is fixed relative to the first member at a predetermined angle within the range.

The above configuration allows the information processing device to be in the form of a laptop personal computer.

An information processing device in accordance with a ninth aspect of the disclosure is configured as in any one of the first to seventh aspects and may be further configured such that the input surface on the back surface of the body section is in contact with the back surface of the first member, and the second portion of the flexible display and the first portion of the flexible display are flush with each other.

The above configuration allows the information processing device to be in the form of a tablet computer having a relatively large display surface.

An information processing device in accordance with a tenth aspect of the disclosure is configured as in the fifth aspect and may be further configured such that the portion of the body section which portion is at and near the second end and the portion of the second member which portion is at and near the fourth end are connected with each other via the connection mechanism, and the back surface of the first member, the back surface of the second member, and the input surface on the back surface of the body section face inward.

The above configuration allows the information processing device to be in the form of a double-sided calendar.

An information processing device in accordance with an eleventh aspect of the disclosure is configured as in the third aspect and may be further configured such that the input surface on the back surface of the body section is in contact with the back surface of the first member, and the back surface of the second member is in contact with the front surface of the body section.

The above configuration allows the information processing device to be in the form of a tablet computer having a relatively small display surface.

An information processing device in accordance with a twelfth aspect of the disclosure is configured as in any one of the first to seventh aspects and may preferably be further configured such that the front surface of the body section is in contact with the first portion of the flexible display, and the second portion of the flexible display is in contact with the input surface on the back surface of the body section.

The above configuration allows the information processing device to be in a form where the flexible display and the body section are protected.

An information processing device in accordance with a thirteenth aspect of the disclosure is configured as in any one of the first to twelfth aspects and may be further configured such that the flexible display is a flexible organic electroluminescent panel.

With the above configuration, the information processing device includes a flexible organic EL panel as the flexible display.

[Supplemental Notes]

The disclosure is not limited to the embodiments, but can be altered by a skilled person in the art within the scope of the claims. The disclosure also encompasses, in its technical scope, any embodiment derived by combining technical means disclosed in differing embodiments. Further, it is possible to form a new technical feature by combining the technical means disclosed in the respective embodiments.

INDUSTRIAL APPLICABILITY

The disclosure is applicable to an information processing device including a flexible display (flexible display panel).

REFERENCE SIGNS LIST

1 Information processing device
2 Plate-shaped body section
2a Side surface of the body section (first end)
2b Side surface of the body section (second end)
2e Depression (connection mechanism)
3 First member
3a Side surface of the first member
3b Side surface of the first member
3c Front surface of the first member
3d Depression
4 Second member
4a Side surface of the second member (third end)
4b Back surface of the second member
4c Front surface of the second member
4d Depression
4e Protrusion (connection mechanism)
4f Side surface of the second member (fourth end)
6 Input surface
6a Lowermost portion of the input surface
7 Flexible display
7U Upper display region of the flexible display
7UL Lowermost portion of the upper display region
7M Middle display region of the flexible display 7L Lower display region of the flexible display
7LL Lowermost portion of the lower display region
8 Flexible hinge
9 Non-flexible movable hinge
10 Angle fixing section
11 Information processing device
19 Flexible hinge

The invention claimed is:

1. An information processing device, comprising:
a body section having a plate shape;
a first member having a plate shape and connected with the body section; and
a second member having a plate shape and connected with the first member,
the body section including a back surface provided with an input surface to perform an input operation,
the first member and the second member including respective front surfaces provided with a single flexible display present across both the front surfaces in which the flexible display is capable of being touched for an input operation,
the body section and the first member being connected with each other via a first connection section, the first connection section being a flexible hinge that allows for rotation at least from (i) an angle at which a front surface of the body section that is on an opposite side of the back surface of the body section is in contact with a first portion of the flexible display that is on the front surface of the first member to (ii) an angle at which the input surface on the back surface of the body section is in contact with a back surface of the first member,
the first member and the second member being connected with each other via a second connection section, the second connection section being a flexible hinge that allows rotation at least within a range from (i) an angle at which a second portion of the flexible display that is on the front surface of the second member is in contact with the first portion of the flexible display to (ii) an angle at which a back surface of the second member is in contact with the back surface of the first member, and
a portion adjacent to a first side surface of the body section that is opposite to a second side surface of the body section in which the first connection section is connected and a portion adjacent to a first side surface of the second member that is opposite to a second side surface of the second member in which the second connection section is connected being connected to each other with a first portion of a connection mechanism that is on the first side surface of the body section.

2. The information processing device according to claim 1, wherein a second portion of the connection mechanism is on the portion adjacent to the first side surface of the second member.

3. The information processing device according to claim 2, wherein the second portion of the connection mechanism is on the back surface of the second member.

4. The information processing device according to claim 1, wherein the back surface of the second member is provided with an angle fixing section capable of fixing the second member relative to the first member at a predetermined angle within the range.

5. The information processing device according to claim 2, wherein
the first portion of the connection mechanism is a protrusion, and
the second portion of the connection mechanism is a depression.

6. The information processing device according to claim 1, wherein at least one of the first connection section and the second connection section includes flexible wiring.

7. The information processing device according to claim 1, wherein at least one of the respective front surfaces of the first member and the second member has a depression.

8. The information processing device according to claim 4, wherein
the front surface of the body section is in contact with the first portion of the flexible display, and
the second member is fixed relative to the first member using the angle fixing section at a predetermined angle within the range.

9. The information processing device according to claim 1, wherein
the input surface on the back surface of the body section is in contact with the back surface of the first member, and
the second portion of the flexible display and the first portion of the flexible display are flush with each other.

10. The information processing device according to claim 2, wherein
the portion adjacent to the first side surface of the body section and the portion adjacent to the first side surface of the second member are connected with each other via the connection mechanism, and
the back surface of the first member, the back surface of the second member, and the input surface on the back surface of the body section face inward.

11. The information processing device according to claim 1, wherein
the input surface on the back surface of the body section is in contact with the back surface of the first member, and
the back surface of the second member is in contact with the front surface of the body section.

12. The information processing device according to claim 1, wherein
the front surface of the body section is in contact with the first portion of the flexible display, and
the second portion of the flexible display is in contact with the input surface on the back surface of the body section.

13. The information processing device according to claim 1, wherein the flexible display is a flexible organic electroluminescent panel.

14. The information processing device according to claim 2, wherein
the first portion of the connection mechanism is a depression, and
the second portion of the connection mechanism is a protrusion.

15. The information processing device according to claim 2, wherein the first portion and the second portion of the connection mechanism are each a magnet.

* * * * *